(12) United States Patent
Menguy et al.

(10) Patent No.: US 11,355,035 B2
(45) Date of Patent: Jun. 7, 2022

(54) CUSTOMIZED GEOSPATIAL POPULATION SEGMENTATION BASED ON A RECEIVED POLYGON DEFINITION

(71) Applicant: Adobe Inc., San Jose, CA (US)

(72) Inventors: Charles Menguy, New York, NY (US); Navin Chaganti, New York, NY (US); Aditya Satishrao Borde, Jersey City, NJ (US)

(73) Assignee: Adobe Inc., San Jose, CA (US)

( * ) Notice: Subject to any disclaimer, the term of this patent is extended or adjusted under 35 U.S.C. 154(b) by 352 days.

(21) Appl. No.: 16/534,505

(22) Filed: Aug. 7, 2019

(65) Prior Publication Data

US 2021/0043116 A1 Feb. 11, 2021

(51) Int. Cl.
| | |
|---|---|
| *G09B 29/10* | (2006.01) |
| *G06F 16/957* | (2019.01) |
| *G06T 11/40* | (2006.01) |
| *G06T 11/20* | (2006.01) |
| *G06F 16/9537* | (2019.01) |
| *G09B 29/00* | (2006.01) |
| *G06F 17/00* | (2019.01) |

(52) U.S. Cl.
CPC ....... *G09B 29/102* (2013.01); *G06F 16/9577* (2019.01); *G06T 11/203* (2013.01); *G06T 11/40* (2013.01); *G06F 16/9537* (2019.01); *G09B 29/007* (2013.01)

(58) Field of Classification Search
CPC . G09B 29/102; G09B 29/007; G06F 16/9577; G06F 16/9537; G06T 11/40; G06T 11/203
See application file for complete search history.

(56) References Cited

U.S. PATENT DOCUMENTS

| | | | | |
|---|---|---|---|---|
| 2008/0010262 | A1* | 1/2008 | Frank | G06F 16/38 |
| 2011/0320319 | A1* | 12/2011 | Streich | G06F 16/29 |
| | | | | 705/27.1 |
| 2020/0120170 | A1* | 4/2020 | Amitay | G06F 3/0488 |

OTHER PUBLICATIONS

Wikipedia, "Point in Polygon," https://en.wikipedia.org/wiki/Point_in_polygon, Jul. 16, 2019, 4 pages.

(Continued)

*Primary Examiner* — Quoc A Tran
(74) *Attorney, Agent, or Firm* — Kilpatrick Townsend & Stockton LLP

(57) ABSTRACT

Certain embodiments involve generating a real-time notification to facilitate the delivery of customized content, based on detecting that a subject activity occurs within a customized subject region. For instance, a computing system updates a graphical interface to display, as a layer on a map, detected instances of a subject activity performed within a geographic area of the map. The computing system determines a polygon corresponding to a region of the geographic area, where the polygon is determined from a graphical input representing lines at locations on the map on which the detected instances are overlaid. The computing system determines that a location of a detected instance of the subject activity performed by a user device falls within the polygon. The computing system transmits a notification to a content provider, such that the content provider delivers customized content to the user device that performed the detected instance of the subject activity.

20 Claims, 7 Drawing Sheets

(56) References Cited

OTHER PUBLICATIONS

Wikipedia, "Ray Casting Algorithm," https://en.wikipedia.org/wiki/Point_in_polygon#Ray_casting_algorithm, Jul. 16, 2019, 4 pages.
Sriharsha, Ram, "How Does Magellan Scale Geospatial Queries," https://magellan.ghost.io/how-does-magellan-scale-geospatial-queries/, Aug. 8, 2017, 14 pages.
Wikipedia, "Z-order Curve," https://en.wikipedia.org/wiki/Z-order_curve, Jul. 18, 2019, 9 pages.
Adobe, "Understanding Segments in Analytics and Audience Manager," https://docs.adobe.com/content/help/en/analytics/integration/audience-analytics/audience-analytics-workflow/aam-analytics-segments.html, Feb. 15, 2019, accessed Aug. 7, 2019, 3 pages.

* cited by examiner

CUSTOMIZED GEOSPATIAL POPULATION SEGMENTATION BASED ON A RECEIVED POLYGON DEFINITION

TECHNICAL FIELD

This disclosure generally relates to population segmentation. More specifically, but not by way of limitation, this disclosure relates to the customized geospatial segmentation of a population based on a received polygon definition, where the polygon definition is optionally facilitated by use of a geospatial dataset.

BACKGROUND

Population segmentation is used for many reasons, such as for customization of online content, improved targeting of electronic services, and others. Population segmentation is the use of data analysis to divide a population into distinct groups, or segments, with different characteristics. Population segmentation can benefit a wide range of businesses. For example, an online content provider system could modify how a website or other user environment is presented to a given user device based on a segment to which a user of the user device is assigned. Examples of modifications include more prominently displaying user interface elements for user devices in a particular segment, tailoring content for a user device assigned to a particular segment, or transmitting website suggestions to devices in a particular segment.

However, existing techniques for segmenting a population do not enable specific targeting based on customized locations. For instance, although behavioral data can be tracked based on a geographic location (e.g., via a Global Positioning System (GPS) device or by way of an Internet Protocol (IP) address), existing systems lack features for fine-tuning the geographic locations used in a segmentation process. For instance, these systems can segment users based on behavioral data matched to cities or other legally distinct geographic units, but cannot be used to target an arbitrary region having specific user characteristics (e.g., a high population of senior residents) or located within a few blocks of a particular business or other landmark. In the absence of such fine-tuned geographic segmentation, online content provider systems cannot effectively tailor websites or other online environments to user devices based on their associated population segments.

SUMMARY

Certain embodiments involve generating a real-time notification to facilitate the delivery of customized content, based on detecting that a subject activity occurs within a customized subject region. For instance, a computing system provides a graphical interface depicting a map of a geographic area and having controls for defining polygons indicating geographical regions for delivery of customized content. The computing system updates the graphical interface to display, as a layer on the map, detected instances of a subject activity performed by user devices. In an illustrative example, the subject activity is visitation to a website associated with an augmented reality game. The game utilizes augmented reality to provide an interactive experience in which game content is shown over the real world when viewing the real world through a user device (e.g., a smartphone or augmented-reality glasses) capable of rendering the game content. The computing system determines and stores a polygon corresponding to a region of the geographic area, where the polygon is determined from a graphical input received via the graphical interface and represents two or more lines at locations on the map on which the detected instances are overlaid. In this example, the graphical input is provided by an administrator of the augmented reality game to represent various areas of town in which interest in the game has been demonstrated based on website visitation shown in the detected instances and, further, in which specific activities of the game occur.

The computing system determines that a location of a detected instance of the subject activity performed by a user device falls within the polygon, where the detected instance is detected during a real-time interval. The computing system generates and transmits, during the real-time interval, a notification to a content provider indicating that the detected instance within the polygon has occurred, such that transmitting the notification causes the content provider to deliver customized content to the user device that performed the detected instance of the subject activity. In this example, upon receiving the real-time notification about a user device having visited a website associated with the game, a content provider associated with the augmented reality game automatically transmits to the user device a notification in the form of a pop-up dialog on the website, inviting the user to an instance of the game having augmented reality aspects located in the geographic region (i.e., the polygon) in which user device visited the website.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
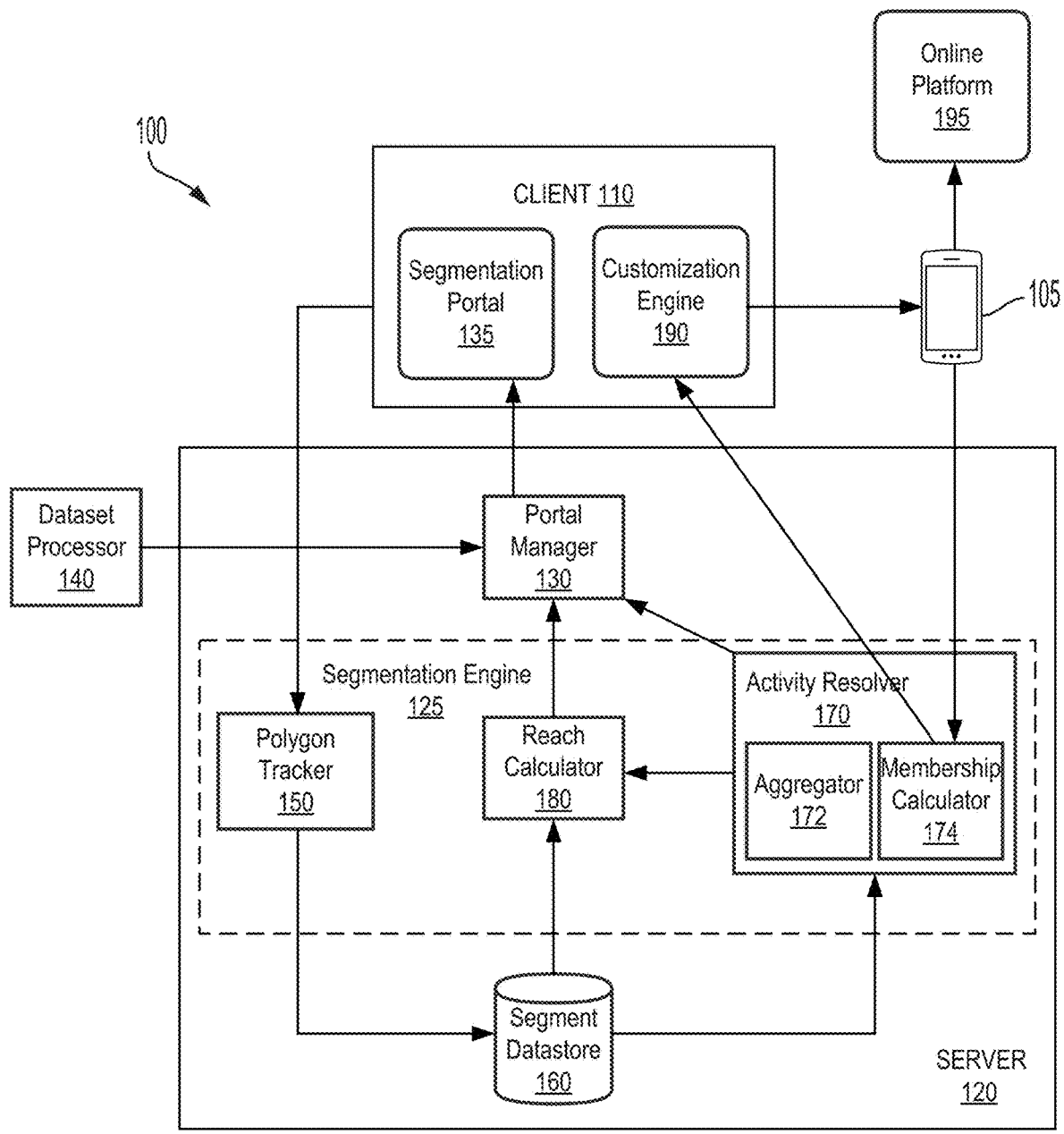
FIG. 1 shows a communications flow in an example of a segmentation system, according to certain embodiments of the present disclosure.

The present disclosure includes systems and methods for segmenting a population in a custom manner based on, for instance, a combination of a custom-drawn region and a behavioral trait, such as visitation to a website. As explained above, conventional solutions lack the ability to customize segmentation based on arbitrary regions. Certain embodiments described herein improve upon segmentation technologies by increasing the precision with which geographical areas can be identified or defined for segmentation-based targeting, thus facilitating improved customization of online content (e.g., websites, interactive content presented on mobile devices).

The following non-limiting example is provided to introduce certain embodiments. In this example, a segmentation system described herein provides access to a set of geospatial datasets and enables an operator to select a geospatial dataset from among those available. For instance, the operator selects a geospatial dataset describing detected website visitation, specifically, visits to a website associated with the operator. As such, the segmentation system displays a representation of website visitations over a map in a manner that illustrates that certain areas of the map are associated with a greater concentration of website visits than are other certain areas.

Continuing with this example, the operator utilizes the selected geospatial dataset (e.g., website visitation) to determine an area to target on the map. To target a certain region, the operator draws a polygon over the map, such by way of drawing a set of lines on a touchscreen input device or by dragging a cursor to form a set of lines. The segmentation system responds to this user input by interpreting the set of lines as a polygon and storing that polygon for future reference, such as in the form of an ordered list of vertices representing both longitude and latitude. The segmentation system adds this newly defined polygon to a set of other polygons that were previously defined, selected, or otherwise provided to the segmentation system.

Such a user-defined area (e.g., the polygon) can be used for targeting online content to one or more user devices. For instance, in the example above, the segmentation system detects, in real time, a behavior such as an interaction with a website associated with the operator. Responsive to detecting such behavior, the segmentation system determines a location of a user device performing the behavior. If the location falls within a polygon in the set of polygons, then the segmentation system alerts the operator in real time that the operator's behavioral criteria and regional criteria have been met.

For instance, in this example, the operator manages a game that utilizes augmented reality to provide an interactive experience in which game content is shown over the real world when viewing the real world through a user device (e.g., a smartphone or augmented-reality glasses) capable of rendering the game content. In this case, the polygons were chosen to represent various areas of town in which interest in the game has been shown based on website visitation and, further, in which specific activities of the game occur. Upon receiving the real-time notification about a user device having visited a website associated with the game, a customization engine associated with the operator automatically transmits to the user device a notification, such as in the form of a pop-up dialog on the website, inviting the user to an instance of the game having augmented reality aspects located in the geographic region (i.e., the polygon) in which user device visited the website. The pop-dialog is interactive in that the pop-up dialog includes a link that, when selected, initiates game play or initiates download of an application necessary for playing the game on the user device.

As used herein, the term "segmentation" or "population segmentation" refers to the act of isolating or identifying a portion of a population. Some embodiments described herein perform segmentation by identifying individual user devices that perform a subject activity within a subject region. For instance, an embodiment performs segmentation by detecting each user device that visits a website when that user device is located within a defined polygonal region, or polygon.

As used herein, the term "subject activity" refers to an activity that has been identified as being subject to segmentation. Some embodiments described herein detect a subject activity performed by a user device and determine whether the location of the performance of the subject activity occurs within a polygonal region. For example, if the subject activity is visiting a website, then an embodiment detects website visitation. In some embodiments, the subject activity need not be a singular event but could be the performance of multiple events. For instance, an example of a subject activity is the occurrence of an event with a threshold frequency or a threshold quantity of times.

As used herein, the term "subject region" refers to a region that has been identified as being subject to segmentation. Some embodiments described herein detect subject activities performed by user devices within a subject region. For example, a subject region is a polygon, or polygonal region.

As used herein, the term "segmentation criteria" refers to criteria used to segment a population. For example, segmentation criteria include a combination of one or more subject activities and one or more subject regions, such that the segment criteria are met if a subject activity occurs in a subject region. As a result of the segmentation criteria being met, some embodiments described herein issue a notification.

As used herein, the term "segment datastore" refers to a storage object, or combination of storage objects, configured to maintain segmentations criteria. For example, a representation of polygon defined to be a subject region is stored in the segment datastore, and a representation of a behavior defined as a subject activity is stored in the segment datastore. For example, the segment datastore is implemented as one or more files, tables, or databases.

As used herein, the term "polygon tracker" refers to a component implemented in hardware or software, or a combination of both, that receives an indication of a region in the form of a polygon. In some embodiments, the polygon tracker stores a representation of each such polygon for future use to enable detection of subject activities occurring within the polygon.

As used herein, the term "membership calculator" refers to a component implemented in hardware or software, or a combination of both, that determines whether a location in which a subject activity occurs falls within at least one polygon in a set of polygons. In some embodiments, a set of polygons and a set of behaviors are associated with an operator and with a client device of the operator, and the membership calculator determines whether an activity (i.e., a behavior) in the set of behaviors occurs at a location within at least one polygon in the set of polygons.

As used herein, the term "aggregator" refers to a component implemented in hardware or software, or a combination of both, that aggregates activities detected by an embodiment of the segmentation system. In some embodiments, the aggregator displays the locations of such activities in the form of a heatmap, enabling an operator to define a polygon for segmentation purposes based on the locations of such activities.

As used herein, the term "segmentation portal" refers to an interface by which an operator accesses aspects of the segmentation system. In some embodiments, a segmentation portal runs on a client device, which is in communication with a server that services aspects of the segmentation system. An example of the segmentation portal is implemented as a client application, such as a web browser or other application, in communication with the server.

As used herein, the term "portal manager" refers to a component implemented in hardware or software, or a combination of both, that directs the segmentation portal to present information and to accept inputs. In other words, the portal manager causes the segmentation portal to provide a graphical interface for an operator. For example, the portal manager is a component on a server, and the segmentation portal is a component on a client in communication with the server. An example of the portal manager causes the segmentation portal to display information to an operator and to receive inputs from the operator by, for instance, transmitting to the segmentation portal instructions and data, such that the segmentation portal follows the instructions to present the data to the operator in a manner instructed by the portal manager.

As used herein, the term "geospatial dataset" refers to a set of data describing a feature based on geographic location. For instance, a geospatial dataset includes data associated with each location in its domain. For example, geospatial datasets include sets describing median income, resident age, property value, climate, and weather.

As used herein, the term "dataset processor" refers to a component implemented in hardware or software, or a combination of both, that accesses one or more geospatial datasets and provides such geospatial datasets to the segmentation portal. In some embodiments, the dataset processor is in communication with the segmentation portal and, as such, provides at least a portion of a geospatial dataset for display in the segmentation portal. As a result, an operator utilizing the segmentation portal is able to make an informed decision about which polygons to define based on information gathered from the geospatial dataset.

As used herein, the term "reach calculator" refers to a component implemented in hardware or software, or a combination of both, that illustrates occurrence of subject activities within subject regions. More specifically, an embodiment of the reach calculator generates a heatmap including polygons defined as subject regions. In an example heatmap, each polygon is color-coded according to the quantity of subject activities occurring at locations within the polygon.

As used herein, the term "customization engine" refers to a component implemented in hardware or software, or a combination of both, that receives a notification if segmentation criteria are met and transmits customized content responsive to such notification. For instance, upon receiving a notification that a user device has performed a subject activity in a subject region, the customization engine transmits to the user device customized content associated with the subject activity or the subject region. In some embodiments, the customized content is transmitted during a real-time interval (i.e., in real time) after the subject activity was performed in the subject region. As such, the customization engine enables the user device to receive actionable content relevant to a current activity or current region of the user device.

As used herein, the term "real-time interval" refers to an interval during which a set of actions are taken in real time following an initial action. For example, after the initial action occurs, a set of actions are deemed to occur in a real-time interval if such actions occur within several minutes of the initial action. For another example, if the initial action is the performance by a user device of a subject activity in a subject region, the set of actions are deemed to occur within a real-time interval if the set of actions occur before the user device leaves the subject region or while the user device is still performing the subject activity.

As used herein, the term "customized content" refers to content that is tailored to a user device to which the content is delivered. Such tailoring is based, for example, on the location of the user device or on an activity performed by the user device such that the activity prompted the delivery of the customized content. For example, customized content is interactive content, which can be, for instance, content including a selectable link such that selection of the link by the user device directs the user device to an online platform, such as a web page or mobile application.

Certain embodiments described herein facilitate targeting segments of the population for various purposes, by utilizing real-time location data of user devices to segment a population. An embodiment of the segmentation system described herein uses a rules-based technique to segment a population by identifying specific user devices that meet a set of segment criteria, which act as rules. An example set of segment criteria includes a set of polygons, each of which is stored as a tuple of vertices, as well as a defined behavior. The segmentation system applies these rules to each user device detected to perform the defined behavior, and if the segmentation system determines that the rules (i.e., the segmentation criteria) are met, the segmentation system facilitates real-time transmission of customized content to the user device. In one example, the customized content provides a link that, when selected, automatically navigates the user device to an online platform, such as a mobile application or a web page. Thus, the segmentation system takes a rules-based approach to indirectly controlling functionality of the user device, by causing the user device to perform a task (e.g., navigate to an online platform) responsive to segmentation criteria being met.

An embodiment of the segmentation system targets user devices in real time based on activities performed by such user devices. The segmentation system enables the use of a custom polygon determined based on aggregated historical activities. If a subject activity is detected to occur in such a polygon, the segmentation system utilizes location data to determine whether the subject activity occurred in this custom polygon. Thus, the segmentation system utilizes an unconventional mechanism of obtaining location data, i.e., based on detection of a subject activity occurring within a custom polygon determined based on aggregated historical activities. As such, the segmentation system is able to segment the population in real time more effectively than done in existing systems, by identifying specific user devices based on precise criteria related to both a behavioral trait (i.e., performance of the subject activity) and a geographical trait (e.g., performance within the custom polygon).

Further, an embodiment of the segmentation system includes a server-side portal manager in communication with a client-side segmentation portal. The portal manager causes the segmentation portal to display a map and, over that map, to display a geospatial dataset, which includes, for example, third-party geospatial data or aggregated historical activities detected by the segmentation system. With the geospatial dataset overlaid on the map, the segmentation portal is configured to receive graphical input, which the server receives and interprets as a polygon. Thus, due to the specific structure of the segmentation portal acting as a graphical interface that overlays geospatial data onto a map, the segmentation system enables the operator (i.e., the user) to precisely define a polygon to be used as segmentation criteria.

Referring now to the drawings, FIG. 1 shows a communications flow of an example of a segmentation system 100, according to certain embodiments of the present disclosure. As shown in FIG. 1, certain embodiments of the segmentation system 100 involve a client 110, also referred to as a client device 110, and a segmentation server 120. The client 110 communicates with the segmentation server 120 to specify how to segment user devices in a population, and the segmentation server 120 issues a notification of real-time activity of a user device that meets the specifications of the client 110. In some embodiments, the segmentation server 120 notifies a customization engine 190 of the real-time activity, and the customization engine 190 provides customized content to the user device 105 responsive to the notification. An example of the customized content includes a link, which, when selected, causes the user device 105 to automatically navigate to an online platform 195.

In some embodiments, the client 110 is a computing device, and the client 110 runs a segmentation portal 135 as a client application through which the client 110 accesses aspects of the segmentation system 100 resident on the segmentation server 120. As shown in FIG. 1 the client 110 could execute the customization engine 190, or alternatively, the customization engine 190 is executed by a distinct device from the client 110. In some embodiments, the customization engine 190 is integrated with the segmentation portal 135. An example of the segmentation server 120 is one or more computing devices, such as a set of computing devices providing distributed services. The example segmentation server 120 includes a segment datastore 160 and executes a segmentation engine 125, which includes a polygon tracker 150, an activity resolver 170 that includes an aggregator 172 and a membership calculator 174, and a reach calculator 180. The segmentation server 120 further executes a portal manager 130, which provides instructions and data to the segmentation portal 135 to cause the segmentation portal 135 to act as an interface. In some embodiments, the portal manager 130 is in communication with a dataset processor 140, which provides a geospatial dataset to be overlaid on a map shown on the segmentation portal 135.

In some embodiments, the segmentation portal 135 is a graphical interface through which a user at the client 110 communicates with aspects of the segmentation system 100. This graphical interface is generated by executing one or more sets of program code that control the use of a display device (e.g., by rendering one or more interfaces on the display device) of the client 110 and that respond to inputs from an input device. Examples of this program code include program code for rendering content for display, program code for creating one or more instances of event listeners or other suitable objects for receiving input from input devices (e.g., a computer mouse, a touchscreen), and program code for modifying the appearance of interface elements based on input received from input devices (e.g., moving a cursor, changing the colors of certain pixels displayed on the screen).

In some embodiments, the portal manager 130 on the segmentation server 120 controls the segmentation portal 135 communicating such program code to the segmentation portal 135, thus causing the segmentation portal 135 to perform some or all of the operations described herein as performed by the segmentation portal 135. For instance, the portal manager 130 provides instructions and data to the segmentation portal 135, such that the instructions describe to the segmentation portal 135 how to display the data and how to interpret inputs received at the client 110. An example of the portal manager 130 provides such instructions and data, for example, in Hypertext Markup Language (HTML) or script code.

The portal manager 130 causes the segmentation portal 135 to display a map on the client 110, where that map is interactive. Based on indications received at the client 110 (e.g., input by a human operator or automated operator), the portal manager 130 causes the segmentation portal 135 to shrink or enlarge the map or to shift the visible area of the map to display a portion of the map not previously visible or to magnify a visible portion. In some embodiments, the portal manager 130 is in communication with the dataset processor 140. An example of the dataset processor 140 is a computing device remote from the client 110 that executes program code for storing one or more geospatial datasets on a non-transitory computer-readable medium, for retrieving one or more stored geospatial datasets from the non-transitory computer-readable medium, and for transmitting one or more retrieved geospatial datasets to one or more devices on a data network.

In some embodiments, the dataset processor 140 maintains, or otherwise has access to, one or more geospatial datasets, which the dataset processor 140 provides to the segmentation portal 135. A geospatial dataset is a set of data describing a feature based on geographic location. For instance, a geospatial dataset includes data associated with each location in its domain. This data maps a given location to a value describing a feature associated with that location. For example, the dataset processor 140 provides to the portal manager 130 one or more of the following geospatial datasets: median income, resident age, and property value. It will be understood that a wide range of geospatial datasets are accessible to some embodiments of the dataset processor 140 and are therefore able to be provided to the portal manager 130 and, thus, to the segmentation portal 135.

The segmentation portal 135 receives, via one or more user inputs at the client 110, segmentation criteria (e.g., a polygonal region in combination with a behavior) indicating which user devices 105 the operator desires to target, and the segmentation server 120 receives such segmentation criteria from the client 110. For example, the segmentation criteria include a subject activity in combination with a subject region. For instance, the segmentation portal 135 receives an indication of a polygon representing a subject region on the map. The indication could be two or more lines connected at a vertex that are drawn by user inputs performed by the operator. The segmentation portal 135 receives these lines as input data and, if needed, implicitly connects open ends of such lines to create a polygon. For instance, the drawing is performed by way of touch on a touchscreen of the client 110, or the drawing is performed by way of dragging a mouse with a selection button on the mouse depressed. Further, in some embodiments, the segmentation portal 135 receives an indication of a behavior, also referred to as a behavioral trait or an activity, to be included as a subject activity in the segmentation criteria. Additionally or alternatively, the behavior may be a default behavior, which need not be specified at the segmentation portal 135, such as visitation to a website associated with the operator or with the client 110. The client 110 transmits the segmentation criteria to the segmentation server 120. More specifically, the client 110 transmits to the segmentation server 120 an indication of one or more polygons received and, if applicable, an indication of one or more behavioral traits received.

At the segmentation server 120, the polygon tracker 150 receives an indication of each such polygon and stores a representation of the polygon in the segment datastore 160 for later use. Analogously, if applicable, the polygon tracker 150 receives an indication of a behavior and stores a representation of the behavior in the segment datastore 160 for later use. In some embodiments, the segment datastore 160 is a storage object configured to maintain segmentation criteria, which are criteria based on which a population is segmented. For example, the segment datastore 160 is implemented as one or more files, tables, or databases. It will be understood that various implementations of the segment datastore 160 are within the scope of embodiments of the invention.

In some embodiments, the membership calculator 174 detects a subject activity in real time, such as an activity specified by at the segmentation portal 135 as part of the segmentation criteria. For instance, the membership calculator detects website visitation if website visitation is the subject activity.

Upon detecting an instance of the subject activity performed by a user device 105, in some embodiments, the membership calculator 174 determines whether a location of such user device 105 falls within a specified polygon stored in the segment datastore 160. If the user device 105 falls within such a polygon, then the segmentation criteria are met, and the membership calculator 174 notifies the operator, such as by transmitting an alert to the customization engine 190 or to some other destination associated with the operator.

In some embodiments, the aggregator 172 aggregates information about detected activities (e.g., subject activities) into a geospatial dataset describing such activities. The aggregator 172 provides the geospatial dataset to the segmentation portal 135, thus enabling a polygon to be drawn based on the activities aggregated. In some embodiments, the additional polygon is used as part of the segmentation criteria. The aggregator 172 provides a visualization illustrating the locations of user devices 105 that performed such detected activities.

In some embodiments, the reach calculator 180 provides a visualization of the various locations of user devices 105 that have met the segmentation criteria. More specifically, for instance, the reach calculator 180 illustrates locations where a subject activity occurred within a subject region (e.g., a polygon).

In some embodiments, the customization engine 190 is associated with the client 110 and could be integrated with the client 110. The customization engine 190 receives from the membership calculator 174 a notification that a user device 105 performed a subject activity in a subject region. Based on this notification, the customization engine 190 transmits customized content (e.g., interactive content) to the user device 105. Examples of such customized content include an email, an automated phone call, and a pop-up dialog within a mobile application. The customized content could be interactive through the embedding of a link, which, when selected, causes the user device 105 to automatically navigate to an online platform 195, such as a web page, a mobile application associated with the operator, or other remote content.

In some embodiments, each of the portal manager 130, the segmentation portal 135, the dataset processor 140, the polygon tracker 150, the activity resolver 170, the aggregator 172, the membership calculator 174, the reach calculator 180, and the customization engine 190 are implemented as hardware, software, or a combination of both. For instance, each of the segmentation portal 135, the dataset processor 140, the polygon tracker 150, the activity resolver 170, the aggregator 172, the membership calculator 174, the reach calculator 180, and the customization engine 190 is a specialized hardware circuit or portion thereof or is implemented as program code executable by processing hardware to perform various operations described herein. Although these components are shown in FIG. 1 as being distinct, it will be understood that the distinction is made for illustrative purposed only, and in some embodiments, two or more of such components are integrated together, or the portal manager 130, the segmentation portal 135, the dataset processor 140, the polygon tracker 150, the activity resolver 170, the aggregator 172, the membership calculator 174, the reach calculator 180, and the customization engine 190 are further divided into smaller components. The above operations and others of these components will be described in more detail below.

Although only a single client 110 is shown in FIG. 1, it will be understood that the depiction of a single client is for illustrative purposes only. In certain embodiments, multiple clients 110 are in communication with the segmentation server 120, such that each client 110 has a respective instance of the segmentation portal 135 configured to provide respective segmentation criteria (e.g., a polygon, a behavior) to the segmentation server 120. The segmentation server 120 is configured to maintain respective segmentation criteria associated with each such instance of the segmentation portal 135 and associated operator and to provide a notification to a destination associated with the instance of the segmentation portal 135 and associated operator if the segmentation criteria associated with that instance are met.

Figure 2:
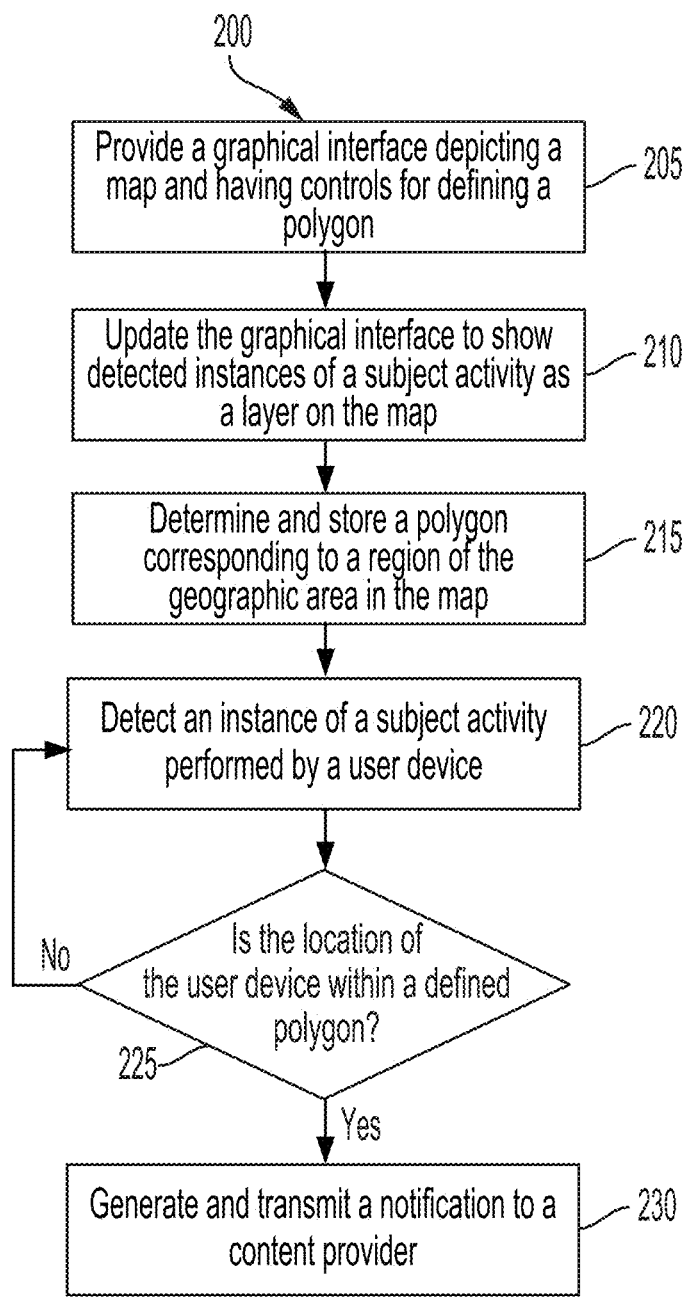
FIG. 2 shows a flow diagram of a process for segmenting a population, according to certain embodiments of the present disclosure.

FIG. 2 shows a flow diagram of an example of a process 200 for segmenting a population, according to certain embodiments of the present disclosure. In some embodiments, prior to the beginning of the process 200, the segmentation portal 135 receives a request to create a subject region for segmentation. An example of the segmentation portal 135 transmits this request to the segmentation server 120, which receives the request.

Block 205 of the process 200 involves providing a graphical interface depicting a map of a geographic area and having controls for defining polygons indicating geographical regions. For instance, the portal manager 130 generates all or a portion of the graphical interface, including a visible region of the map, for transmission to the client 110 and display in the segmentation portal 135. The segmentation portal 135 displays the map on the client 110.

Block 210 of the process 200 involves updating the graphical interface to display, as a layer on the map, detected instances of a subject activity performed by user devices 105. In some embodiments, the activity resolver 170 detects and aggregates instances of the subject activity, as described in detail below. Thus, the portal manager 130 communicates with the activity resolver 170 or accesses data provided by the activity resolver 170 to update the graphical interface to display the detected instances of the subject activity as a layer over the map in the segmentation portal 135. As a result of this update, an example of the segmentation portal 135 displays the detected instances as a layer over the map.

Block 215 of the process 200 involves determining and storing a polygon corresponding to a region of the geographic area, where the polygon is determined from a graphical input received via the graphical interface. For instance, the segmentation portal 135 receives a graphical input provided by an operator, who provides the graphical input by drawing all or a portion of a polygon at the segmentation portal 135 (e.g., on a touchscreen or with a mouse of the client 110). If the object drawn is not a closed shape, an example of the segmentation portal 135 treats the shape as if an additional line connects two open ends of the shape to create a closed polygon. Generally, the polygon represents a subject region being targeted by the operator. Thus, an example of the segmentation system 100 will look for a subject activity occurring within the polygon.

The segmentation portal 135 transmits a representation of the polygon to the polygon tracker 150 on the segmentation server 120, which in turn receives the representation of the polygon. An example of the polygon tracker 150 stores the polygon. For instance, the polygon tracker 150 stores the polygon in the segment datastore 160. In some embodiments, the segmentation portal 135 transmits, and the polygon tracker 150 receives, the polygon in a representation in which the polygon will be stored in the segment datastore 160. Alternatively, however, the segmentation portal 135 transmits the polygon in some other representation (e.g., as an image), and the polygon tracker 150 translates the polygon into a different representation for storage in the segment datastore 160. If the representation of the polygon, as received by the polygon tracker 150, is not a closed shape, an example of the polygon tracker 150 treats the shape as if an additional line connects open ends of the shape to create a closed polygon.

In some embodiments, the segmentation portal 135 receives inputs representing multiple polygons, and each such polygon represents a subject region. In such cases, the polygon tracker 150 receives each such polygon from the segmentation portal 135 and stores each such polygon in the segment datastore 160.

In some embodiments, the polygon tracker 150 stores a polygon in the segment datastore 160 as an ordered set, or ordered list, of tuples, where each tuple is a vertex (e.g., latitude and longitude). Hypothetically, the polygon could be redrawn by drawing lines from one vertex to the next in the order of the ordered set. In the segment datastore 160, each polygon is associated with the operator, the client 110, or the instance of the segmentation portal 135 running on the client 110 that originated the polygon. As such, the segmentation server 120 is able to distinguish which subject regions are targeted by which clients 110 in cases where multiple clients 110 are in communication with the segmentation server 120.

A polygon acts as a segmentation trait making up at least a part of the segmentation criteria, and thus, the segmentation system 100 combines the polygon with other segmentation criteria associated with the client 110. Some embodiments of the segmentation portal 135 provide an additional technique of defining a polygon other than drawing. For example, the portal manager 130 causes the segmentation portal 135 to allow the operator to enter an ordered set of tuples representing a polygon, and the segmentation portal 135 receives such entry. The segmentation portal 135 transmits the ordered set to the polygon tracker 150, which stores the ordered set in the segment datastore 160 as a polygon used in the segmentation criteria.

In some embodiments, the segment datastore 160 includes not only polygons, but also one or more subject activities, or behavioral traits. Some embodiments of the segmentation system 100 segment a population by issuing a notification if segmentation criteria are met. For example, the segmentation criteria are met if a subject activity occurs in a subject region, such as polygon that is a member of the set of polygons. In one example, the client 110 is associated with a website, and a subject activity included in the segmentation criteria is the act of visiting the website or accessing some other web-based resource.

In some embodiments, blocks 205 and 210 are optional or unavailable. For instance, the portal manager 130 causes the segmentation portal 135 to display a map enabling an operator to draw a polygon, without detected instances of a subject activity overlaid on the map as guidance for drawing the polygon. In such cases, the polygon tracker 150 still receives and stores the resulting polygon.

Block 220 of the process 200 involves detecting performance of a subject activity. For instance, the membership calculator 174 detects performance of the subject activity. In some embodiments, the process for detecting that the subject activity has been performed depends on the subject activity itself. In one example, if the subject activity is visitation to a website or visitation to certain web pages having certain characteristics (e.g., web pages having signup forms), a web server running the website communicates with the membership calculator 174 to inform the membership calculator 174 of which user devices 105 are visiting the website or are visiting certain web pages. In another example, if the subject activity is the purchase of a product or service on the website, the web server communicates information about such purchases to the membership calculator 174. Through such communications with the web server in these cases, the membership calculator 174 detects the subject activity.

The subject activity need not be a singular event. For instance, the subject activity could be the performance of an action (e.g., visitation to a website) after having performed such action within a threshold recency (e.g., within the last three days). In another example, the subject activity is performing an action a threshold number of times or in a threshold frequency. In yet another example, the subject activity is performing an action in a certain manner (e.g., from a computer rather than a mobile device). Thus, more generally, some examples of subject activities are defined based on frequency or recency, and some examples of subject activities based on qualitative considerations, such as visiting a web page with a certain characteristic or performing an action in a certain manner. To detect such subject activities, the membership calculator 174 may maintain a log of past activities detected, and the membership calculator 174 may utilize that log to determine recency, frequency, or other criteria as needed.

In some embodiments, definition of the subject activity occurs prior to detecting an instance of the subject activity and could occur through various techniques. In some embodiments, the segmentation system 100 uses, as a default subject activity, visitation to a website associated with the operator. In another example, the segmentation portal 135 receives from the operator an indication of the subject activity, such as in the form of a selection from among various subject activities. To this end, for instance, the portal manager 130 causes the segmentation portal 135 to display available subject activities or to otherwise prompt the operator for an input indicating a subject activity. Responsive to receiving an indication of the subject activity, the segmentation portal 135 passes such indication to the segmentation server 120, which stores an indication of the subject activity in the segment datastore 160. In some embodiments, multiple subject activities are defined, and in that case, the membership calculator 174 detects each instance of each subject activity. It will be understood that definition and storage of a subject activity occurs prior to the beginning of this process 200 or at various points during the process 200.

Decision block 225 of the process 200 involves determining whether the location of the user device 105 when performing the subject activity falls within a polygon in the set of polygons. In some embodiments, the membership calculator 174 determines the location of the subject activity in a manner known in the art. In one example, if the IP address of the user device 105 is known (e.g., received from a web server), then the web server or the membership calculator 174 resolves the IP address back to a mobile tower servicing the user device 105. In another example, the user device 105 utilizes GPS, and the web server or membership calculator 174 receives from the user device 105 the GPS location of the user device 105.

In some embodiments, the membership calculator 174 monitors activities in real time to compute, for each subject activity, whether the location of such subject activity falls inside a polygon acting as a subject region. To this end, the membership calculator 174 considers each polygon in the set of polygons and determines whether the coordinates (e.g., the latitude and longitude) of the location of the user device 105 at the time of performing the subject activity is within the polygon. The membership calculator 174 makes this determination for each polygon until it is determined that the user device 105 is in at least one of such polygons or until all polygons have been considered.

It will be understood that various techniques exist for determining whether a point (e.g., the location of the user device 105) falls within a polygon (e.g., a polygon defined as a subject region), and one or more of such techniques are used in some embodiments. The membership calculator 174 utilizes a technique that achieves a relatively fast result because, in some cases, the membership calculator 174 may need to compute polygon membership for billions of activities with respect to hundreds or thousands of polygons in real time.

For example, the membership calculator 174 uses a modified ray-casting technique in some embodiments. For instance, to reduce the cases where ray casting is applied, the membership calculator 174 computes the smallest rectangle (i.e., a bounding box) that encloses the polygon and determines whether the location is inside or outside the bounding box, which is a fast determination. If the location falls outside the rectangle, then the membership calculator 174 determines that the location falls outside the polygon as well, and ray casting need not be performed for that polygon. To further reduce complexity, if the location falls inside the bounding box, the membership calculator divides the interior of the bounding box into rectangular (e.g., square) cells, determines the containing cell into which the location falls, and determines whether such containing cell falls within or overlaps the polygon. If the containing cells falls completely outside the polygon, then the location falls outside the polygon as well, and the membership calculator 174 need not perform ray casting. However, if the containing cell overlaps or falls within the polygon, then the membership calculator 174 performs ray casting or another appropriate technique to determine whether the location falls within the polygon.

If the location does not fall within any polygon in the polygon set (i.e., the location falls outside each polygon), then the process 200 returns to block 220 to detect additional performances of subject activities. Otherwise, if the location falls within at least one polygon, the process 200 proceeds to block 230.

As described above, in this example process 200, the membership calculator 174 determines whether a subject activity falls within a subject region (e.g., a polygon). More generally, however, an example of the membership calculator 174 determines whether the segmentation criteria are met based on the performance of a subject activity. In some embodiments, the segmentation criteria are defined as a Boolean combination. For instance, an example set of segmentation criteria are ("a user device is in a defined polygon" AND "the user device is visiting the website" AND "the user device is known to have visited the website once before in the past day"). It will be understood that a wide variation of segmentation criteria are possible, and an embodiment of the membership calculator 174 detects when such segmentation criteria are met.

Block 230 of the process 200 includes generating and transmitting a notification to a content provider indicating that the segmentation criteria have been met. For instance, the membership calculator 174 sends an alert to the customization engine 190 or transmits an email to an email address associated with the operator, the client 110, or the instance of the segmentation portal 135. It will be understood that various notification techniques exist, and the membership calculator 174 may utilize one or more of such techniques. The process 200 then returns to block 220 to detect additional performances of subject activities.

In some embodiments, the customization engine 190 delivers customized content to the user device 105 that performed the subject activity, based on or responsive to the notification of performance of the subject activity inside the polygon. For instance, the customized content is interactive content. In one example, the interactive content is web-based content in which user interface elements deemed relevant to the user device 105 are highlighted or in which the web-based content is tailored to the user device 105, based on the user device 105 having performed the subject activity in the subject region. In another example, the interactive content is a text or email with a selectable link. Upon being selected, an example of such interactive content initiates navigation to an online platform 195. For example, and not by way of limitation, upon receiving the notification, the client 110 or other device associated with the content provider automatically transmits to the user device 105 an email with a link to a specific web page relevant to the geographic region corresponding to the polygon in which the user device 105 performed the subject activity. Thus, the content provider could utilize the notification to provide to the user device 105 real-time information relevant to the location of the user device.

In some embodiments, blocks 220 through 230 of the process 200 are performed responsive to performance of the subject activity and during a real-time interval (i.e., in real time) following such performance. In an example, for each instance of the subject activity performed within a polygon, the membership calculator 174 detects the instance, determines that the location occurs within the polygon, and transmits the notification within a span of several seconds or several minutes after the beginning of such performance. In another example, the membership calculator 174 transmits the notification within a timeframe that enables a content provider associated with the operator to provide customized content to the user device 105 while the subject activity is still occurring, for example, while the user device 105 is still in a session on the website in a case where website visitation is the subject activity. In yet another example, the membership calculator 174 transmits the notification within a timeframe that enables the content provider associated with the operator to provide customized content to the user device 105 while the user device 105 is still located within a geographic region corresponding to the polygon or, in other words, before the user device 105 leaves the geographic region corresponding to the polygon.

In some embodiments, blocks 220 through 230 are performed for each detected subject activity. Thus, each activity defined in the segmentation criteria is detected. If this activity is performed by a user device 105 having a location within a polygon that is also part of the segmentation criteria, then the membership calculator 174 issues a notification. Further, in some embodiments, blocks 205 through 215 are performed multiple times, such as each time the operator indicates a desire to define a new polygon to be used as a subject region in the segmentation criteria.

In some embodiments, additionally or alternatively to providing detected instances of a subject activity as a layer on a map, an embodiment of the portal manager 130 provides some other geospatial dataset as a layer on the map. For instance, the portal manager 130 causes the segmentation portal 135 to display an option to select a geospatial dataset, for instance, responsive to a request to define a new subject region. To this end, an example of the portal manager 130 communicates with the dataset processor 140 to obtain a list of available geospatial datasets from the dataset processor 140. The portal manager 130 causes the segmentation portal 135 to display such list of the geospatial datasets and enables the selection of one or more of such geospatial datasets. For example, the portal manager 130 causes the segmentation portal 135 to display a drop-down list, enabling the operator to select one of such available geospatial datasets. The segmentation portal 135 receives a selection of a geospatial dataset, and the portal manager 130 receives the selection from the segmentation portal 135.

Responsive to receiving the selection of a geospatial dataset, an embodiment of the portal manager 130 requests the dataset processor 140 to provide the geospatial dataset, specifically, a portion of the geospatial dataset corresponding to locations displayed on the map. An example of the portal manager 130 causes the segmentation portal 135 to display the geospatial dataset as a layer on the map. In some embodiments, the geospatial dataset includes data in the form of values describing a feature at coordinates (e.g., latitude and longitude) on the map. The portal manager 130 receives from the dataset processor 140 values associated with coordinates displayed on the map. In some embodiments, the dataset processor 140 provides access to third-party geospatial datasets on a third-party server, and the portal manager 130 causes the segmentation portal 135 to overlay (i.e., plot) each of such third-party datasets on the map.

For instance, if the geospatial dataset describes median income, then various coordinates on the map are associated with values representing median incomes, and the portal manager 130 causes such values to be represented on the map. More specifically, for instance, to overlay the geospatial dataset on the map, the portal manager 130 causes the segmentation portal 135 to display numerical values showing the median income for various areas of the map, where each numerical value is displayed at or proximate the area with which the numerical value is associated.

Figure 3:
FIG. 3 shows a geospatial dataset overlaid on a map to facilitate segmentation, according to certain embodiments of the present disclosure.

FIG. 3 shows a geospatial dataset overlaid on a map 300, according to certain embodiments of the present disclosure. Specifically, in this example, the geospatial data set represents the feature of median income. In this example, the geospatial dataset is displayed based on regions, where each region is associated to a value of median income. The various values of median incomes associated with coordinates within a region of the map are aggregated to result in a value for the region as a whole. Further, the map 300 includes a scale 320, which illustrates how the shading of a region is related to the aggregate median income of the region.

In some embodiments, the portal manager 130 causes the segmentation portal 135 to adjust the scale of the geospatial dataset as displayed over the map 300. For instance, based on an indication from the operator, which indication is passed from the segmentation portal 135 to the portal manager 130, the portal manager 130 causes the segmentation portal 135 to display a finer representation of the geospatial dataset by adjusting the regions, for instance, by dividing the regions shown into smaller regions in an increased quantity, such that each adjusted region is now associated with an aggregate median income. Analogously, based on an indication from the operator, which is passed from the segmentation portal 135 to the portal manager 130, the portal manager 130 causes the segmentation portal 135 to display a coarser representation of the geospatial dataset by adjusting the regions, for instance, by combining the regions shown into larger regions in a decreased quantity, such that each adjusted region is now associated with an aggregate median income.

Additionally, in this example, the portal manager 130 has caused the segmentation portal 135 to show on the map 300 the locations of various landmarks 330 associated with the operator and, thus, associated with the client 110 and the instance of the segmentation portal 135 running on the client 110. For example, the landmarks 330 are healthcare facilities, pop-restaurants, service locations, or store locations. The illustration of such landmarks 330 enables the operator to see where such landmarks 330 are positioned relative to high and low median incomes or, more generally, to the displayed geospatial dataset.

In some embodiments, the display of the geospatial dataset helps the operator understand the demographics of the area shown on the map, which enables the operator to make an informed decision about which areas on the map to target as subject regions. As described above, in some embodiments, the segmentation portal 135 and, in turn, the polygon tracker 150 receives input representing a polygon, where that input can be lines drawn on the map while the geospatial dataset is overlaid on the map. Upon receiving an indication of the polygon, the polygon tracker 150 stores a representation of the polygon in the segment datastore 160, enabling the segmentation server 120 to provide real-time notification of occurrence of a subject activity within the polygon as shown in blocks 220 through 230.

Certain embodiments of the aggregator 172 of the segmentation system 100 aggregate detected activities, such as subject activities and, optionally, activities that are not currently subject to segmentation. For instance, the activities detected are defined at the segmentation portal 135 or correspond to one or more default behaviors defined by the segregation system 100. In some embodiments, the membership calculator 174 detects the performance of such activities and communicates information about such performances to the aggregator 172.

The aggregator 172 aggregates historical activities (i.e., past activities) for a predetermined span of time up to the present (e.g., for the previous year). For instance, that span of time is selected at the segmentation portal 135 or system defined. The aggregator 172 surfaces the resulting aggregate data representing the historical activities to provide such aggregate data on the client 110 in an easily consumable format for the operator. In some embodiments, the aggregator 172 or the portal manager 130 transmits to the segmentation portal 135 of the client 110 a representation of a heatmap representing historical activities. Thus, the aggregator 172 or the portal manager 130 causes the segmentation portal 135 to display the heatmap on the client 110.

Figure 4:
FIG. 4 shows an example of a heatmap showing historical activities detected, according to certain embodiments of the present disclosure.

FIG. 4 shows an example of such a heatmap 400 showing historical activities detected, according to certain embodiments of the present disclosure. For instance, the aggregator 172 generates the heatmap 400, and the segmentation portal 135 displays the heatmap 400 on the client 110. The aggregator 172 clusters past activities together based on location and represents such clusters with markers 410. As shown in FIG. 4, an example of the heatmap 400 shows various markers 410. Each marker 410 is positioned at coordinates corresponding to a latitude and longitude, and each marker represents a set, or cluster, of activities that occurred during the timeframe represented by the heatmap 400 and located proximate the longitude and latitude represented by the position of the marker 410. As shown in FIG. 4, in an example heatmap 400, each marker 410 displays a numerical value indicating how many activities are in the cluster represented by the marker 410. Additionally or alternatively, an example heatmap 400 illustrates one or more landmarks 330 as described above to enable the operator to visualize such landmarks 330 in relation to the historical activities.

In some embodiments, the concentration of activities (i.e., quantity of activities within a space) represented by each marker 410 is variable from one marker 410 to another based, for instance, on how activities are dispersed throughout the visible area of the map. Additionally or alternatively, the concentration of activities represented by a marker 410 is determined by the magnification of the heatmap 400. For instance, if the segmentation portal 135 magnifies the heatmap 400, then the concentration of past activities within the visible area of the heatmap 400 as displayed changes. Thus, for example, if the heatmap 400 is enlarged, which results in spreading out the historical activities, the portal manager 130 splits a marker 410 that represented a set of activities prior to the enlargement into two or more markers 410 representing the set of activities. Analogously, for instance, if the magnification of the heatmap 400 is reduced, then the concentration of past activities within a particular the visible area of the heatmap 400 as displayed increases. Thus, for example, if the heatmap 400 is reduced, which results in further concentrating the activities, two or more markers 410 that together represented a set of activities prior to the reduction are combined into a single marker 410.

Figure 5:
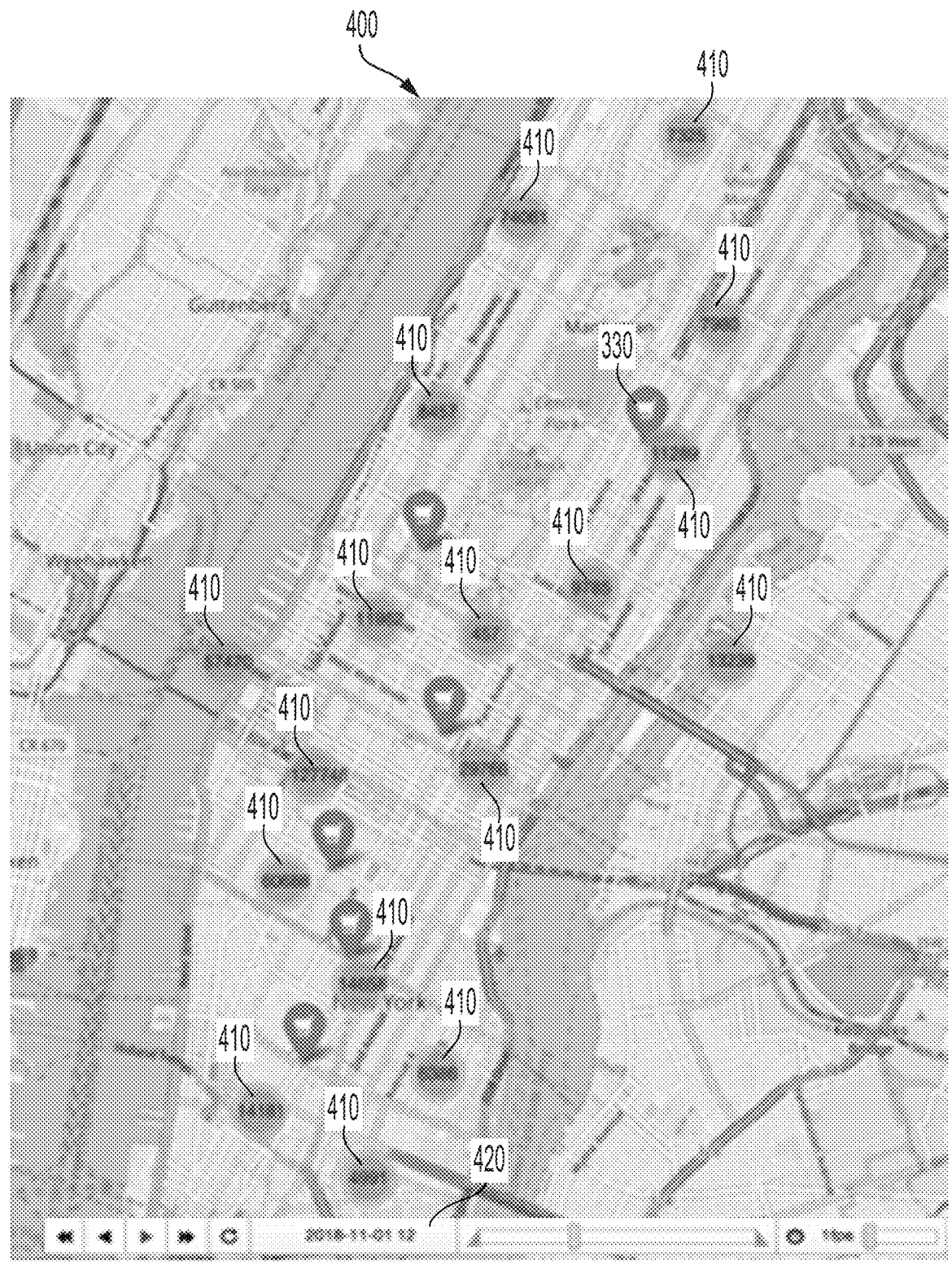
FIG. 5 shows another example of a heatmap showing historical activities detected, according to certain embodiments.

FIG. 5 depicts another example of a heatmap 400 showing historical activities, according to certain embodiments. More specifically, FIG. 5 shows the heatmap 400 of FIG. 4 after an enlargement. As illustrated by comparing FIG. 5 to FIG. 4, after the enlargement, the quantity of markers 410 has increased, but the markers 410 represent smaller clusters of activities as indicated by the smaller numerical values displayed on the markers 410. More generally, the clusters of activities represented by the markers 410 are scale sensitive in certain embodiments.

In some embodiments, the segmentation portal 135 provides controls associated with heatmap 400, where such controls enable the operator to indicate changes to how the heatmap 400 displays the historical activities. In one example, the heatmap 400 includes zoom controls (i.e., magnification controls). In another example, as shown in each of FIG. 4 and FIG. 5, the heatmap 400 includes a control panel 420.

In some embodiments, the heatmap 400 represents a timeframe such that each activity represented on the heatmap 400 occurred during that timeframe. In the example of FIG. 4, the control panel 420 enables the operator to change the timeframe represented by the heatmap 400. In one example, the control panel 420 includes a control to lengthen or shorten the timeframe, such that the historical activities represented in the heatmap 400 belong to, respectively, a longer or shorter timeframe. In another example, the control panel 420 includes one or more controls to play, rewind, or fast-forward a time progression of the heatmap 400. More specifically, for instance, while the heatmap 400 is playing, the segmentation portal 135 adjusts the timeframe by shifting the timeframe forward repeatedly at a first rate, and the heatmap 400 changes over time based on the changing timeframe. While the heatmap 400 is fast-forwarding, the segmentation portal 135 adjusts the timeframe by shifting the timeframe forward repeatedly at a second rate, which is faster than the first rate, and the heatmap 400 changes over time based on the changing timeframe. While the heatmap 400 is rewinding, the segmentation portal 135 adjusts the timeframe by shifting the timeframe backward repeatedly at a third rate, which is optionally equal to the second rate, and the heatmap 400 changes over time based on the changing timeframe. Thus, using the control panel 420, an operator can request progressive changes in the timeframe represented by the heatmap 400, and the segmentation portal 135 implements such changes.

The historical activities represented in the heatmap represent a geospatial dataset generated by the aggregator 172. In some embodiments, the segmentation portal 135 enables the operator to input a new polygon while the geospatial dataset of historical activities detected is displayed over the map 300. In other words, the segmentation system 100 enables the operator to define a polygon based on historical activities (e.g., user traffic to a website), where such activities may have been defined by the operator at the client 110 or otherwise. For instance, as described above, the operator can draw two or more lines representing a polygon, and an example segmentation portal 135 receives such input and interprets the input as a polygon. The segmentation portal 135 transmits a representation of the polygon to the polygon tracker 150, which stores a representation of the polygon in the segment datastore 160.

In some embodiments, the reach calculator 180 of the segmentation system 100 utilizes the aggregate data corresponding to subject activities occurring in subject regions. More generally, the reach calculator 180 illustrates the reach (i.e., subject activities detected) of each polygon in the polygon set.

Figure 6:
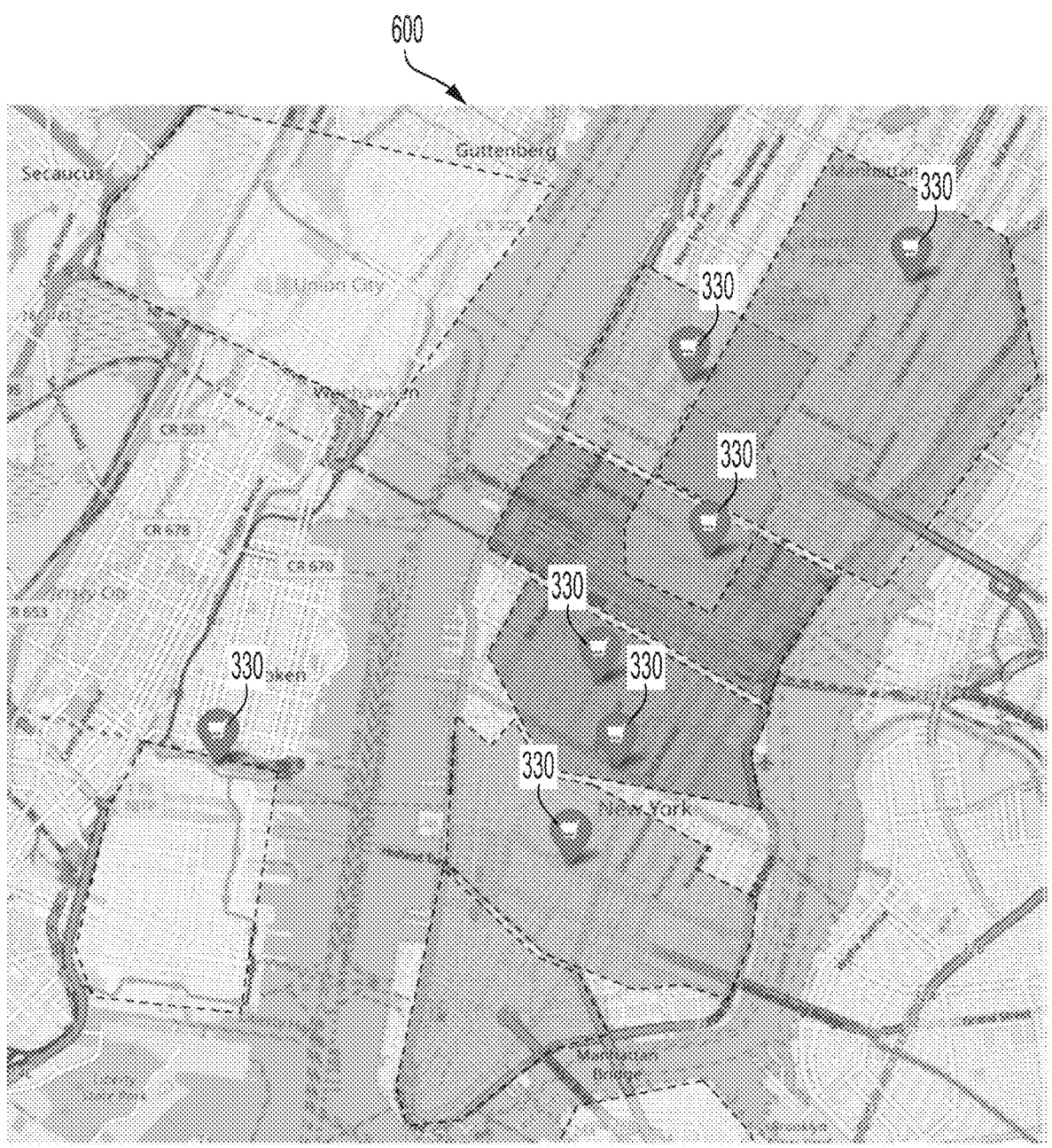
FIG. 6 shows an example of a heatmap illustrating subject activities identified based on segmentation criteria, according to certain embodiments.

FIG. 6 shows an example of such a heatmap 600 illustrating subject activities identified based on segmentation criteria, according to certain embodiments. In some embodiments, the reach calculator 180 generates a representation of the heatmap 600 and transmits the representation of the heatmap 600 to the client 110, where the segmentation portal 135 displays the heatmap 600. As shown in FIG. 6, this example heatmap 600 shows at least a subset of the polygons in the set of polygons. For instance, an example heatmap 600 shows all polygons in the set of polygons that are within the visible area of the heatmap 600. An example heatmap 600 further illustrates one or more landmarks 330 as described above, to assist the operator in visualizing the location of such landmarks 330 relative to the polygons.

Like the heatmaps 400 of FIG. 4 and FIG. 5, the heatmap 600 of FIG. 6 is associated with a timeframe, which is dynamic, such that only subject activities that occurred during the timeframe are represented in the heatmap 600. In some embodiments, for each polygon shown, the heatmap 600 indicates quantities of subject activities that occurred during a timeframe associated with the heatmap 600. However, as shown in FIG. 6, the heatmap 600 generated by the reach calculator 180 clusters subject activities based on polygons, such that each polygon indicates a quantity of subject activities that occurred within that polygon. For example, such indication is made by way of coloring, such that the heatmap 600 is color-coded. In this case, a range of quantities maps to a color. If a first quantity of activities occurred in a polygon during the represented timeframe, then in the heatmap 600, the polygon is illustrated in a first color to which the first quantity maps. Thus, the variance of colors over the heatmap 600 illustrates variance in locations of the subject activity.

In some embodiments, the reach calculator 180 and the segmentation portal 135 update the heatmap 600 in real time. For instance, each time the membership calculator 174 detects a new instance of a subject activity, the reach calculator 180 updates the heatmap 600. If the heatmap 600 is currently being viewed on the segmentation portal 135, the reach calculator 180 communicates the update to the client 110 for display in the segmentation portal 135.

In some embodiments, the polygons in the heatmap 600 are selectable, and selecting a polygon causes the segmentation portal 135 to display additional information about activities in the polygon. For example, responsive to the operator selecting a polygon (e.g., by touching the polygon on a touchscreen or by clicking on the polygon with a mouse), the segmentation portal 135 receives the selection and displays information such as one or more of the following: quantity of unique subject activities that occurred in the selected polygon during the timeframe, percentage of unique subject activities overall that occurred within the selected polygon during the timeframe, and a description of the geographic area inside the polygon. Thus, the heatmap of FIG. 6 enables an operator to see how the polygons are performing in terms of how many subject activities occurred in each polygon.

Figure 7:
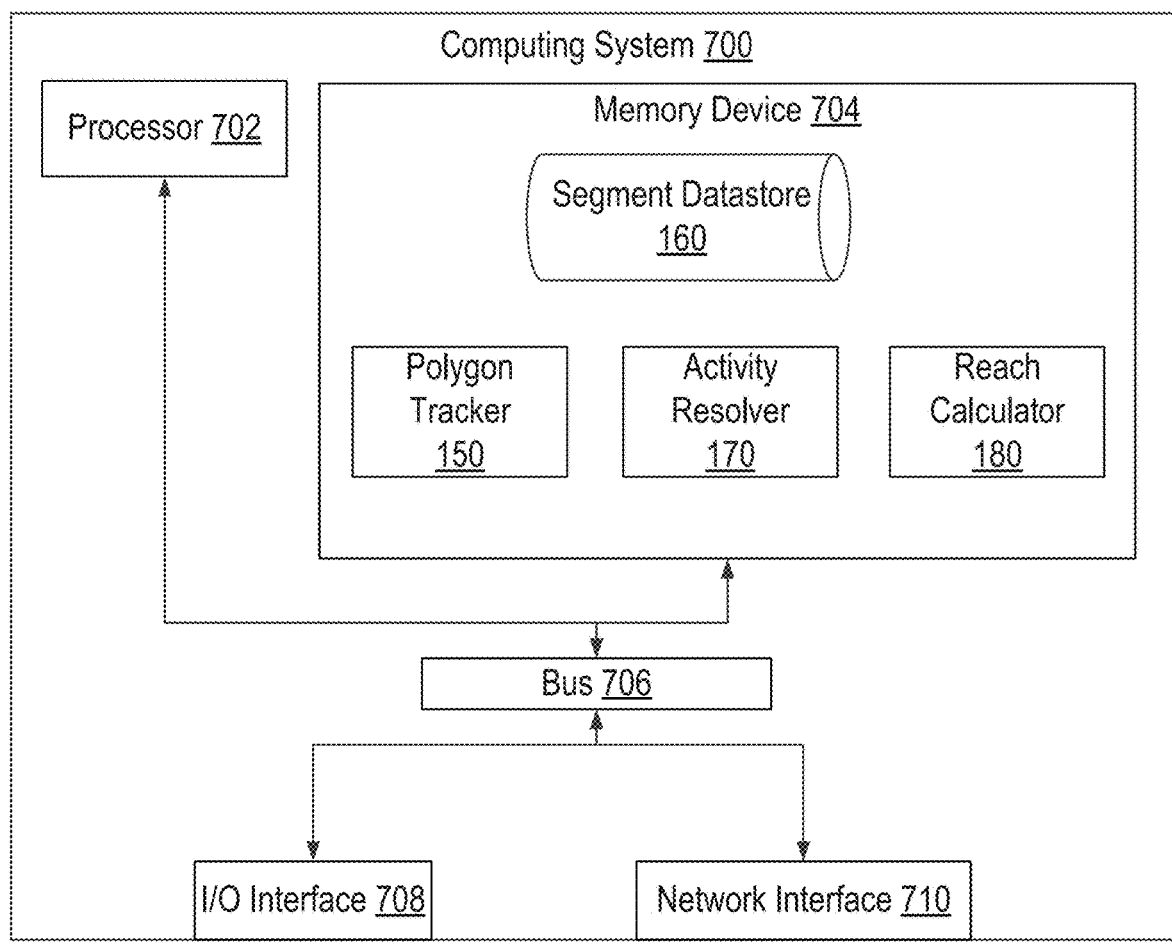
FIG. 7 depicts an example of a computing system that performs certain operations described herein, according to certain embodiments of the present disclosure.

Any suitable computing system or group of computing systems can be used for performing the operations described herein. For example, FIG. 7 depicts an example computing system 700 useable as the segmentation server 120. In some embodiments, the computing system 700 executes the polygon tracker 150, the activity resolver 170, and the reach calculator 180. In other embodiments, execution of the polygon tracker 150, the activity resolver 170, and the reach calculator 180 are distributed across two or more computing systems 700.

The depicted example of a computing system 700 includes a processor 702 communicatively coupled to one or more memory devices 704. The processor 702 executes computer-executable program code stored in a memory device 704, accesses information stored in the memory device 704, or both. Examples of the processor 702 include a microprocessor, an application-specific integrated circuit ("ASIC"), a field-programmable gate array ("FPGA"), or any other suitable processing device. The processor 702 can include any number of processing devices, including a single processing device.

The memory device 704 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 700 may also include a number of external or internal devices, such as input or output devices. For example, the computing system 700 is shown with one or more input/output ("I/O") interfaces 708. An I/O interface 708 can receive input from input devices or provide output to output devices. One or more buses 706 are also included in the computing system 700. The bus 706 communicatively couples one or more components of a respective one of the computing system 700.

The computing system 700 executes program code that configures the processor 702 to perform one or more of the operations described herein. The program code includes, for example, code implementing the polygon tracker 150, the activity resolver 170, and the reach calculator 180, or other suitable applications that perform one or more operations described herein. The program code may be resident in the memory device 704 or any suitable computer-readable medium and may be executed by the processor 702 or any other suitable processor. In some embodiments, each of the polygon tracker 150, the activity resolver 170, and the reach calculator 180 is stored in the memory device 704, as depicted in FIG. 7. In additional or alternative embodiments, one or more of the polygon tracker 150, the activity resolver 170, and the reach calculator are stored in different memory devices of different computing systems. In additional or alternative embodiments, the program code described above is stored in one or more other memory devices accessible via a data network.

The computing system 700 can access the segment datastore 160 in any suitable manner. In some embodiments, some or all of the segment datastore 160, the polygon tracker 150, the activity resolver 170, and the reach calculator 180 are stored in the memory device 704 of a single computing system 700, as in the example depicted in FIG. 7. Alternatively, For example, a computing system 700 that executes the polygon tracker 150 can provide access to the segment datastore 160 by an external systems that executes the activity resolver 170. In additional or alternative embodiments, one or more of the segment datastore 160, the polygon tracker 150, the activity resolver 170, and the reach calculator 180 described herein are stored in one or more other memory devices accessible via a data network.

The computing system 700 also includes a network interface device 710. The network interface device 710 includes any device or group of devices suitable for establishing a wired or wireless data connection to one or more data networks. Non-limiting examples of the network interface device 710 include an Ethernet network adapter, a modem, and the like. The computing system 700 is able to communicate with one or more other computing devices (e.g., a client 110) via a data network using the network interface device 710.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method in which one or more processing devices perform operations comprising:
   providing a graphical interface depicting a map of a geographic area and having controls for defining polygons indicating geographical regions for delivery of customized content;
   updating the graphical interface to display, as a layer on the map, detected instances of a subject activity performed by user devices;
   receiving graphical input representing two or more lines connected at a vertex on the map on which the detected instances are overlaid, wherein the graphical input is drawn by a user via the graphical interface;
   interpreting the graphical input as a polygon describing a polygonal geographic region of the geographic area;
   storing the polygon in association with segmentation criteria related to the subject activity;
   determining that the segmentation criteria are met based on a detected instance of the subject activity performed by a user device falling within the polygonal geographic region, wherein the detected instance is detected during a real-time interval; and
   generating and transmitting, during the real-time interval, a notification to a content provider indicating that the detected instance within the polygonal geographic region has occurred, wherein transmitting the notification causes the content provider to deliver customized content to the user device that performed the detected instance of the subject activity.

2. The method of claim 1, the operations further comprising:
   receiving, from a client device, an indication of the subject activity;
   detecting the detected instances of the subject activity based on the indication; and
   aggregating the detected instances to generate a geospatial dataset comprising the detected instances.

3. The method of claim 1, wherein updating the graphical interface to display the detected instances of the subject activity comprises:
   generating a heatmap to illustrate how the detected instances relate to locations represented by the map; and
   updating the graphical interface to display the heatmap.

4. The method of claim 3, the operations further comprising:
   storing a second polygon corresponding to a second region of the geographic area,
   wherein generating the heatmap comprises:
      shading the polygon in a first color based on a first quantity of the detected instances associated with locations within the polygon; and
      shading the second polygon in a second color based on a second quantity of the detected instances associated with locations within the second polygon.

5. The method of claim 3, wherein the heatmap comprises a first marker in a first location on the map, the first marker representing a first detected instance and a second detected instance both occurring proximate the first location and both being instances of the subject activity, the operations further comprising:
   updating the graphical interface to magnify the map; and
   updating the graphical interface to replace the first marker on the map with a second marker representing the first detected instance and a third marker representing the second detected instance, based on magnification of the map.

6. The method of claim 1, the operations further comprising:
   storing a second polygon corresponding to a second region of the geographic area;
   detecting, during a second real-time interval, a second instance of the subject activity performed by a second user device;
   determining a second location of the second instance of the subject activity performed by the second user device;

determining that the second location does not fall within the polygon;

determining that the second location falls within the second polygon; and transmitting, during the second real-time interval, a second notification to the content provider indicating that the second instance has occurred, wherein transmitting the notification causes the content provider to deliver customized content to the second user device.

7. The method of claim 1, the operations further comprising receiving, from a client device, a definition of the subject activity.

8. The method of claim 1, wherein the subject activity is user traffic to a website.

9. The method of claim 1, wherein the subject activity comprises multiple events.

10. The method of claim 9, wherein the subject activity is defined based on at least on of frequency and recency.

11. The method of claim 1, the operations further comprising:

detecting the detected instance; and determining a location of the detected instance of the subject activity performed by the user device.

12. The method of claim 1, the operations further comprising:

receiving, from a client device, a selection of a geospatial dataset;

requesting the geospatial dataset from a third-party server, responsive to the selection of the geospatial dataset;

updating the graphical interface to display, as a second layer on the map, a representation of the geospatial dataset; and determining and storing a second polygon corresponding to a second region of the geographic area, wherein the second polygon is determined from a second graphical input received via the graphical interface and represents an additional two or more lines at locations on the map on which the representation of the geospatial dataset is overlaid.

13. A non-transitory computer-readable medium embodying program code for segmenting a population, the program code comprising instructions that, when executed by a processor, cause the processor to perform operations comprising:

providing a graphical interface depicting a map of a geographic area and having controls for defining polygons indicating geographical regions for delivery of customized content;

updating the graphical interface to display, as a layer on the map, detected instances of a subject activity performed by user devices;

receiving graphical input representing two or more lines connected at a vertex on the map on which the detected instances are overlaid, wherein the graphical input is drawn by a user via the graphical interface;

interpreting the graphical input as a polygon describing a polygonal geographic region of the geographic area;

storing the polygon in association with segmentation criteria related to the subject activity;

determining that the segmentation criteria are met based on a detected instance of the subject activity performed by a user device falling within the polygonal geographic region, wherein the detected instance is detected during a real-time interval; and generating and transmitting, during the real-time interval, a notification to a content provider indicating that the detected instance within the polygonal geographic region has occurred, wherein transmitting the notification causes the content provider to deliver customized content to the user device that performed the detected instance of the subject activity.

14. The non-transitory computer-readable medium of claim 13, wherein updating the graphical interface to display the detected instances of the subject activity comprises:

generating a heatmap to illustrate how the detected instances relate to locations represented by the map; and updating the graphical interface to display the heatmap.

15. The non-transitory computer-readable medium of claim 14, the operations further comprising:

storing a second polygon corresponding to a second region of the geographic area, wherein generating the heatmap comprises:

shading the polygon in a first color based on a first quantity of the detected instances associated with locations within the polygon; and shading the second polygon in a second color based on a second quantity of the detected instances associated with locations within the second polygon.

16. The non-transitory computer-readable medium of claim 14, wherein the heatmap comprises a first marker in a first location on the map, the first marker representing a first detected instance and a second detected instance both occurring proximate the first location and both being instances of the subject activity, the operations further comprising:

updating the graphical interface to magnify the map; and updating the graphical interface to replace the first marker on the map with a second marker representing the first detected instance and a third marker representing the second detected instance, based on magnification of the map.

17. The non-transitory computer-readable medium of claim 13, the operations further comprising:

storing a second polygon corresponding to a second region of the geographic area;

detecting, during a second real-time interval, a second instance of the subject activity performed by a second user device;

determining a second location of the second instance of the subject activity performed by the second user device;

determining that the second location does not fall within the polygon;

determining that the second location falls within the second polygon; and transmitting, during the second real-time interval, a second notification to the content provider indicating that the second instance has occurred, wherein transmitting the notification causes the content provider to deliver customized content to the second user device.

18. The non-transitory computer-readable medium of claim 13, the operations further comprising:

receiving, from a client device, a selection of a geospatial dataset;

requesting the geospatial dataset from a third-party server, responsive to the selection of the geospatial dataset;

updating the graphical interface to display, as a second layer on the map, a representation of the geospatial dataset; and determining and storing a second polygon corresponding to a second region of the geographic area, wherein the second polygon is determined from a second graphical input received via the graphical interface and represents an additional two or more lines at locations on the map on which the representation of the geospatial dataset is overlaid.

19. A method in which one or more processing devices perform operations comprising:

displaying a graphical interface depicting a map of a geographic area and having controls for defining polygons indicating geographical regions for delivery of customized content;

updating the graphical interface to display, as a layer on the map, detected instances of a subject activity performed by user devices;

receiving graphical input representing two or more lines connected at a vertex on the map on which the detected instances are overlaid, wherein the two or more lines are drawn by a user and represent a polygon corresponding to a region of the geographic area;

transmitting the polygon to a segmentation server for storage, wherein the segmentation server detects an instance of a subject activity performed by a user device at a location within the polygon during a real-time interval; and delivering, during the real-time interval, customized content to the user device that performed the detected instance of the subject activity at the location within the polygon.

20. The method of claim 19, the operations further comprising:

receiving a selection of a geospatial dataset;

updating the graphical interface to display, as a second layer on the map, a representation of the geospatial dataset; and receiving a second set of two or more lines at locations on the map on which the representation of the geospatial dataset is overlaid, wherein the second set of two or more lines represent a second polygon corresponding to a second region of the geographic area;

transmitting the second polygon to the segmentation server for storage, wherein the segmentation server detects a second instance of the subject activity performed by a second user device at a second location within the second polygon during a second real-time interval; and delivering, during the second real-time interval, customized content to the second user device that performed the second instance of the subject activity at the second location within the second polygon.

* * * * *